United States Patent [19]

Dobler et al.

[11] 4,133,504

[45] Jan. 9, 1979

[54] SYSTEM FOR PROTECTED DATA TRANSMISSION TO TRACK-BOUND VEHICLES

[75] Inventors: Karl-Ulrich Dobler, Waiblingen; Richard Spannagel, Stuttgart, both of Germany

[73] Assignee: International Standard Electric Corporation, New York, N.Y.

[21] Appl. No.: 830,374

[22] Filed: Sep. 2, 1977

[30] Foreign Application Priority Data

Sep. 10, 1976 [DE] Fed. Rep. of Germany ....... 2640756

[51] Int. Cl.² .............................................. B61L 27/00
[52] U.S. Cl. ................................... 246/5; 246/187 B; 340/146.1 BA
[58] Field of Search ............... 246/63 R, 63 C, 167 R, 246/3, 4, 5, 187 B; 340/146.1 BA; 364/306, 307

[56] References Cited

U.S. PATENT DOCUMENTS 3,737,577   6/1973   Birkin .................... 340/146.1 BA
3,794,834   2/1974   Auer ........................... 246/187 B Primary Examiner—Trygve M. Blix
Assistant Examiner—Reinhard J. Eisenzopf
Attorney, Agent, or Firm—John T. O'Halloran; Robert A. Walsh

[57] ABSTRACT

The specification discloses a system for protected data transmission between a control center and a plurality of track-bound vehicles. The data is not acknowledged as correct until it is contained in two successive data messages which are compared. The comparison indicates whether the difference between the two successive messages is within predetermined limits.

4 Claims, 2 Drawing Figures

FIG. 1
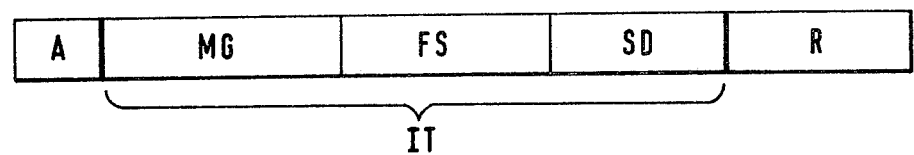
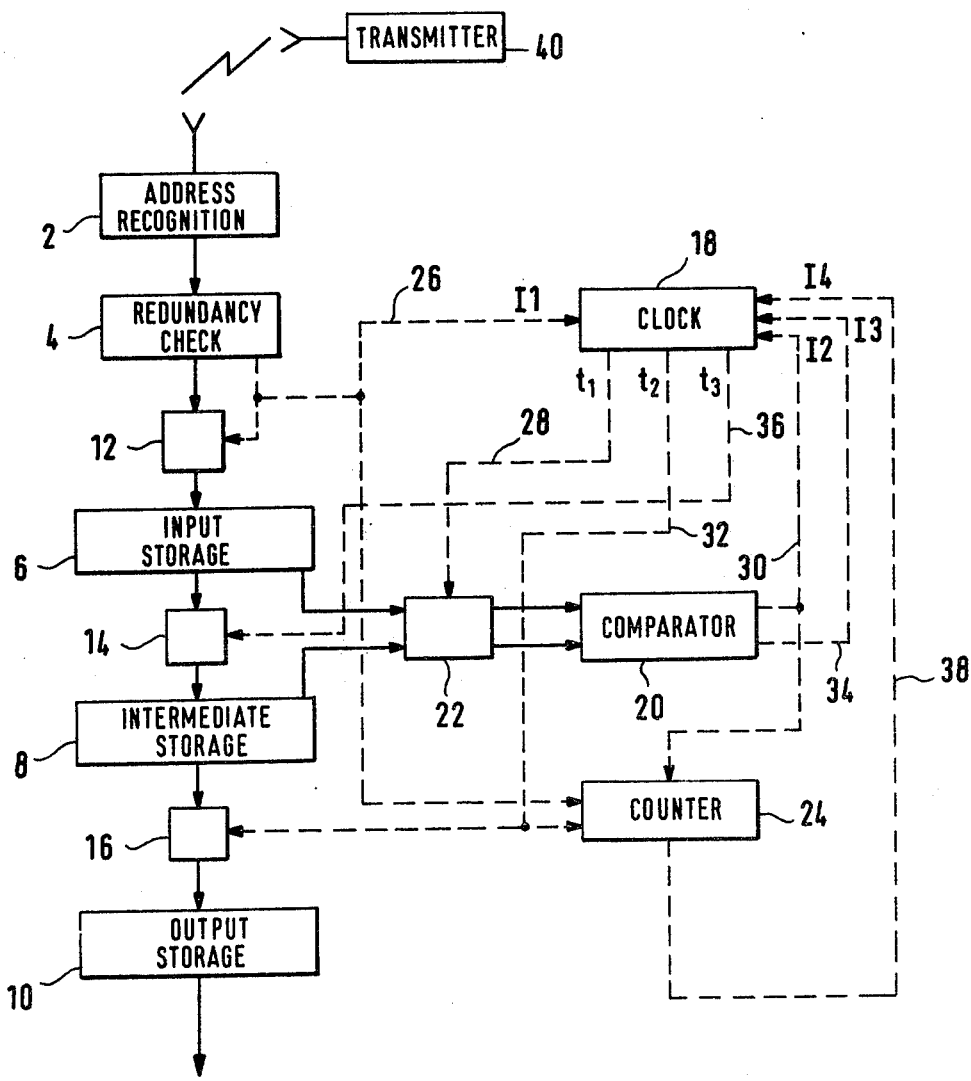
FIG. 2

SYSTEM FOR PROTECTED DATA TRANSMISSION TO TRACK-BOUND VEHICLES

BACKGROUND OF THE INVENTION

The present invention relates to a system for reliable data transmission from a control center to one or more receivers, particularly to automatically controlled vehicles, which receive information in the form of data messages over either a continuous track conductor system or a radio link, with the data messages protected by redundant bits.

Automatic control of a number of track-bound vehicles from a center by means of cyclically transmitted data messages assigned to the individual vehicles by their respective addresses is well known.

DESCRIPTION OF THE PRIOR ART

The integrity of the transmission of data messages from the control center to the vehicle and from the vehicle to the control center can be protected in various ways. In a known method, the vehicles, in response to a message received from the control center, transmit back to the center a reply message from which the center recognizes whether an error has occurred in the transmission to or from the vehicle. This error indication is communicated to the vehicle. When a transmission error has been detected, the message is repeated once or several times until the transmission is error-free. In case of a complete breakdown in transmission, the vehicle is braked automatically within a given time or after having traveled a given distance.

This known method, developed for railway purposes, may be too slow and time-consuming in short-distance traffic systems where, instead of few trains, many small vehicle units are to run on all lines at shorter time intervals between them. The increase in the number of vehicles involves an increase in vehicle sequence, and the distance between vehicles on main lines may be as short as 10 seconds.

This increase in number of vehicles and shorter distance between vehicles reduces the maximum amount of data which can be transmitted between the control center and each vehicle due to resulting prolonged transmission cycle time (which increases with the number of vehicles per control center) and reduced total time available for data transmission.

In such a short distance high traffic system, an information protecting method where each message is answered and, on occurrence of transmission errors, repeated several times would require increasing the minimum distance between the vehicles.

A reduction in cycle time can be achieved by assigning each vehicle a frequency of its own on which it communicates with the control center. This allows messages to be transmitted to several vehicles simultaneously but is quite costly.

The object of the invention is to provide a simple data transmission system which permits vehicle control information to be transmitted in a considerably shorter time without any decrease in safety.

SUMMARY OF THE INVENTION

The system according to the invention has, at the control center, a data output device which cyclically transmits all data messages a number of times independently of the receivers even if no change in message contents is necessary; and, at each receiver, an evaluating circuit which will not acknowledge each item of information contained in a data message intended for the respective receiver as correct until one or more of the subsequent data messages intended for said receiver contain an identical item of information (or an item of information changed within permissible ranges).

Thus, the decision of whether the information is erroneous is made at the vehicle. This eliminates the need to reply to each data message and to communicate to the vehicles the detection of a transmission error at the control center. In addition, transmission errors occurring only in a single message are rapidly detected which saves the time required for check-backs with the control center and subsequent repetitions of messages. In the case of a message containing information relating to a quantity varying within predetermined limits or in a given direction, such as information on destination coordinates, the variation is considered by comparison of successively arriving data messages which permit such quantities to be varied continuously from one data message to another.

The evaluating circuit at each receiver consists of an input storage, an intermediate storage, an output storage, a clock generator, and a comparator. The comparator compares a data message just received (stored in input storage after a redundancy check) with the prior data message (stored in intermediate storage). If no error is detected, the data message stored in intermediate storage and the data message stored in input storage are transferred to output storage and intermediate storage, respectively. If error is detected, the contents of the intermediate storage is erased and the contents of input storage is transferred to intermediate storage.

Another feature of the system according to the invention permits a comparison of individual bit groups in a data message by use of a switch that applies the contents of input storage and of intermediate storage to the comparator in bit groups containing complete sets of information. The individual bit groups are applied to the comparator serially.

The comparator may consist of a plurality of subcomparators associated with individual bit groups of a data message so that all bits groups to be compared are compared in parallel.

The comparator may be one which forms the difference between the two data messages so that the contents of the intermediate storage or portions thereof are transferred to the output storage if the storage contents or bit groups to be compared differ by a predetermined value or by predetermined limits. This ensures that a data message or item contained therein will not be considered erroneous if the contents have been subjected to predetermined changes from the previous data message.

A further feature of the invention is that the control center contains the same evaluating circuit as the vehicles to evaluate data messages transmitted from the vehicles to the center.

BRIEF DESCRIPTION OF THE DRAWING

A preferred embodiment of the system according to the invention will now be described with reference to the accompanying drawings, in which:

FIG. 1 shows the format of a data message; and

FIG. 2 is a block diagram of the system according to the invention. The dotted lines shown in FIG. 2 represent control functions.

DESCRIPTION OF THE PREFERRED EMBODIMENT

The control center 40 constantly and cyclically transmits data messages addressed to the individual vehicles. Each message has an address portion A, a redundant portion R and an information portion IT which contains bit groups for information necessary for control purposes. For example, in FIG. 1, bit groups for the maximum speed MG, distance FS, and other control commands SD, are shown.

In FIG. 2, address recognition circuit 2, redundancy check circuit 4, input storage 6, intermediate storage 8, and output storage 10 are connected in series.

Switching devices 12, 14 and 16 are connected, respectively, between the redundancy check circuit 4 (a feedback shift register) and input storage 6 and between the storages 6 and 8 and 8 and 10, respectively. These switches transfer information from one storage to the next. Control for the switching devices is supplied by clock pulse generator 18 which is, in turn, controlled by a comparator 20. Comparator 20 compares the contents of the intermediate storage 8 and the contents of input storage 6. The comparator is connected to storage devices 6 and 8 by a switching device 22. Check counter 24 checks whether all bit groups stored in the input storage 6 and the intermediate storage 8 have been compared.

The operation of the circuit is as follows: a data message received from the control center in serial form is recognized by the address recognition circuit 2 as being intended for the respective vehicle. The message is then passed to the redundancy check circuit 4 which converts the contents of the message from serial to parallel form and checks the correctness of the redundancy. If the redundancy is correct, switching device 12 transfers the information portion of the data message to input storage 6. At that time, a first interrupt signal I1 is transmitted to the clock generator 18 and to the check counter 24. On receipt of this interrupt signal, check counter 24 is reset to zero. The interrupt signal I1 causes clock generator 18 to generate a clock signal t1 connected to switching device 22, via connection 28, causing the switching device 22 to apply the contents of the input storage 6 and of the intermediate storage 8 to the comparator 20 in bit groups. In case of agreement or a permissible difference between the two storage contents, a second interrupt signal I2 is transmitted via connection 30 which causes the clock generator 18 to generate a clock signal t2 which, via connection 32, enables switching device 16 to transfer the contents of intermediate storage 8 to output storage 10, and advances check counter 24. If comparator 20 indicates an error, an interrupt signal I3 is produced on connection 34 causing the clock generator 18 to provide a clock signal t3 which, via connection 36, causes switching device 14 to transfer the bit group stored in input storage 6 to intermediate storage 8. At the end of the comparison of all bit groups of a message, check counter 24 provides a final interrupt signal I4 which, via connection 38, stops the clock generator until a new interrupt signal I1 from redundancy check circuit 4 starts a new evaluation cycle. At the end of the evaluation cycle, the contents of output storage 10 are converted into the corresponding control commands for the individual vehicle units.

A parallel comparison of individual bit groups may be performed instead of the serial comparison. In such event, the comparator would be larger and include a plurality of subcomparators, each dedicated to individual bit groups. Input of the bit groups into the subcomparators and comparison of individual bit groups would be performed in parallel providing a considerable saving of time. Check counter 24 would be replaced with an AND gate.

While we have described above the principles of our invention in connection with specific apparatus, it is to be clearly understood that this description is made only by way of example and not as a limitation to the scope of our invention as set forth in the objects thereof and in the accompanying claims.

We claim:
1. A system for reliable data transmission comprising:
 (a) means for repeatedly transmitting data messages;
 (b) means for receiving said messages;
 (c) means connected to said receiving means for evaluating said messages for error, said last named means including comparison means for comparing one of said transmitted messages with at least one of said subsequently transmitted messages;
 (d) storage means for storing said data messages, said storage means includes an input storage means for storing a message; intermediate storage means connected to said input storage means for storing a message received prior to receipt of the message stored in said input storage means; and output storage means for storing a message determined to be free of error by said comparison means; and
 (e) control means connected to said storage means and to said comparison means, said control means controlling said storage means to read from said storage means a message upon indication from said comparison means that said message is free of error.

2. The system of claim 1, wherein said control means includes signal generating means for generating control signals to transfer the data messages from said input storage means to said intermediate storage means and lastly, to said output storage means.

3. The system of claim 1, wherein said control means includes a switching means for transferring information from one storage means to another.

4. The system of claim 3, wherein said control means includes a clock means for generating clock pulses to control the switching means.

* * * * *